(12) United States Patent
Sumimoto et al.

(10) Patent No.: US 8,984,928 B2
(45) Date of Patent: Mar. 24, 2015

(54) MOMENT CALIBRATING APPARATUS FOR MULTI-COMPONENT FORCE GAUGE AND METHOD OF MOMENT CALIBRATION

(75) Inventors: Yu Sumimoto, Takasago (JP); Takayuki Fukuda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 359 days.

(21) Appl. No.: 13/522,573

(22) PCT Filed: Jan. 27, 2011

(86) PCT No.: PCT/JP2011/000441
§ 371 (c)(1),
(2), (4) Date: Jul. 17, 2012

(87) PCT Pub. No.: WO2011/093078
PCT Pub. Date: Aug. 4, 2011

(65) Prior Publication Data
US 2012/0297858 A1    Nov. 29, 2012

(30) Foreign Application Priority Data
Jan. 29, 2010    (JP) .................................. 2010-018578

(51) Int. Cl.
*G01L 25/00*    (2006.01)
*G01M 1/04*    (2006.01)

(52) U.S. Cl.
CPC ............... *G01L 25/00* (2013.01); *G01L 25/003* (2013.01); *G01M 1/045* (2013.01)
USPC ............................................ 73/1.09; 73/1.08

(58) Field of Classification Search
None
See application file for complete search history.

(56) References Cited

U.S. PATENT DOCUMENTS

| 5,020,357 | A | 6/1991 | Kovacevic et al. |
| 6,484,574 | B1 * | 11/2002 | Douglas et al. .................. 73/462 |
| 6,629,446 | B2 * | 10/2003 | Parker ............................. 73/1.15 |
| 2002/0088268 | A1 * | 7/2002 | Parker ............................. 73/1.15 |

FOREIGN PATENT DOCUMENTS

EP    1293765 A2 *   3/2003    ............... G01L 25/00
JP    59 151032    8/1984
(Continued)

OTHER PUBLICATIONS

Machine translation of EP 1293765.*
(Continued)

*Primary Examiner* — Peter Macchiarolo
*Assistant Examiner* — Nathaniel Kolb
(74) *Attorney, Agent, or Firm* — Oblon, McClelland, Maier & Neustadt, L.L.P.

(57) ABSTRACT

A moment calibrating apparatus (1) is provided with an elongated force transmitting member (6) for transmitting a force applied to the end portion thereof to a multi-component force gauge (5), a load applying mechanism (7) for applying a load without changing the direction of the force along a direction perpendicular to said end portion, and a calculation unit (8) for calculating a true moment free from the effect of a perpendicular load on the basis of the moment value around the axis in the direction orthogonal to the perpendicular direction, measured by the multi-component force gauge (5) under the condition that said perpendicular load along the direction perpendicular to said end portion is applied by the load applying mechanism (7), wherein a moment calibration of the multi-component force gauge (5) is performed using said true moment calculated by the calculation unit (8).

5 Claims, 4 Drawing Sheets

(56) References Cited

FOREIGN PATENT DOCUMENTS

| | | | |
|---|---|---|---|
| JP | 64 61643 | 3/1989 | |
| JP | 01061643 A * | 3/1989 | ............... G01L 25/00 |
| JP | 6 21834 | 3/1994 | |
| JP | 2003 4598 | 1/2003 | |

OTHER PUBLICATIONS

International Search Report Issued Apr. 26, 2011 in PCT/JP11/000441 Filed Jan. 27, 2011.

Office Action issued Aug. 20, 2013 in Japanese Patent Application No. 2010-018578 (with English—language translation).

* cited by examiner

MOMENT CALIBRATING APPARATUS FOR MULTI-COMPONENT FORCE GAUGE AND METHOD OF MOMENT CALIBRATION

TECHNICAL FIELD

The present invention relates to a moment calibrating apparatus for a multi-component force gauge and a method of moment calibration.

BACKGROUND ART

Tire testing apparatuses used for special inspection, evaluation, development and the like are equipped with multi-component force gages capable of measuring forces (Fx, Fy, Fz) along orthogonal three axes applied to tires rotating in contact with a road surface or moments (Mx, My, Mz) around the axes. Such a multi-component force gage is always calibrated when it is incorporated into the tire testing apparatus for the first time. Further, even after the incorporation into the tire testing apparatus, the multi-component force gauge is continually calibrated, for example, at predetermined regular time intervals to maintain its accuracy in measurement of the forces or the moments.

For example, Patent Document 1 discloses a calibration method for calibrating a multi-component force gauge itself and a jig or a device for performing calibration. In the calibration method, a weight is attached to the multi-component force gauge through a rope and a pulley (a tackle) to thereby exert a force given by the weight or a moment generated by the weight on the multi-component force gauge, and the multi-component force gauge is calibrated accordingly. The calibration method is intended to separately calibrate the multi-component force gauge as a single unit removed from a tire testing apparatus, and not designed for calibrating the multi-component force gage that remains incorporated in the tire testing apparatus.

Figure 4:
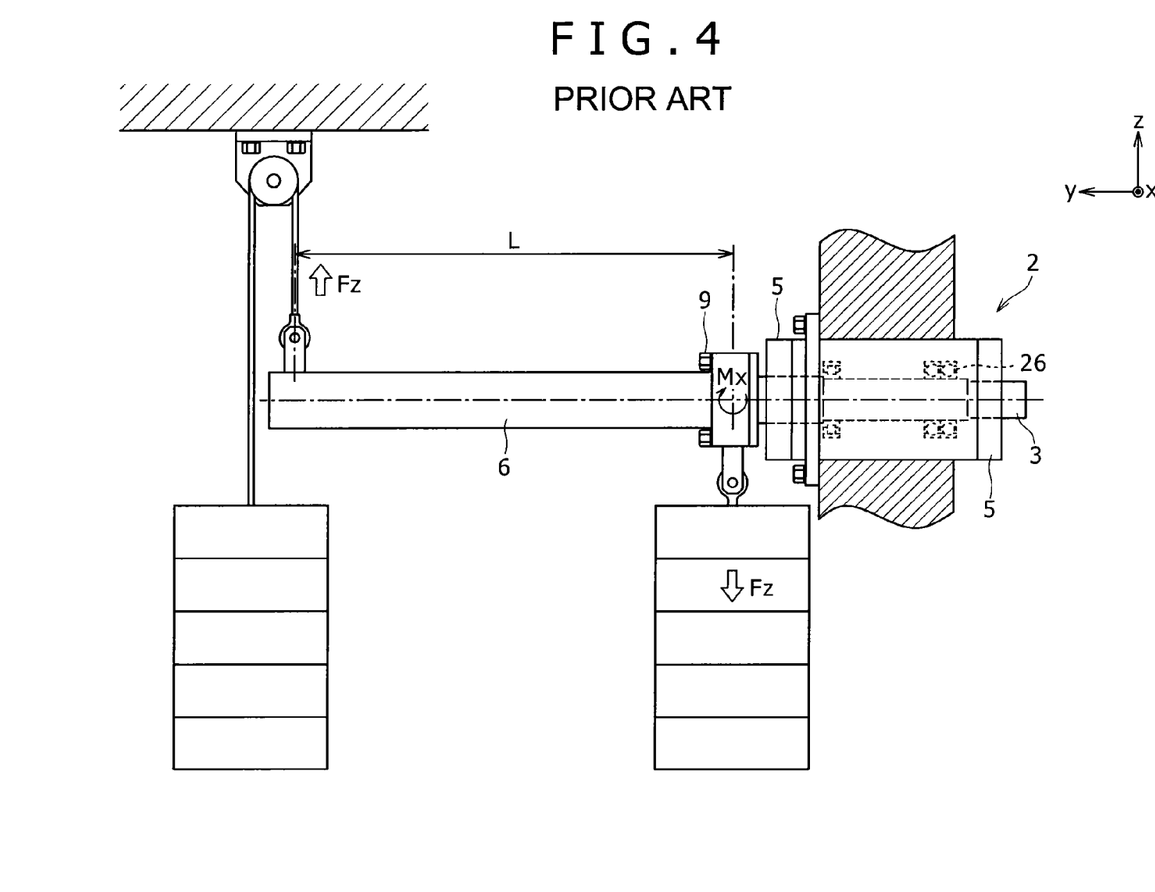
FIG. 4 is a front view showing a conventional moment calibrating apparatus using a weight.

On the other hand, there has been a calibration apparatus for calibrating a multi-component force gauge that is in a state incorporated in a tire spindle. For example, FIG. 4 shows such a calibration apparatus for calibrating the multi-component force gauge that is in the state incorporated in the tire spindle in a tire testing apparatus in which the multi-component force gauge is incorporated in the tire spindle rotatably including a spindle shaft for retaining a tire. The calibration apparatus is employed at an actual manufacturing location.

In the calibration apparatus, moments to be measured by the multi-component force gauge are calibrated as described below. That is, a long-shaped force transmitting member is extended from an end of a spindle shaft along an axial direction thereof, and a rope is installed on an end region of the force transmitting member. A weight is tied to an end of the rope via a tackle, to thereby exert an upward force Fz on the end region of the force transmitting member. In this way, a moment Mx corresponding to a product of a load Fz of the weight and a length L of the force transmitting member is exerted together with the upward force Fz about an X axis on a tire mounting location. For causing the multi-component force gauge to accurately detect only the moment, measurement must be performed under a condition that the upward force Fz is absent. Thus, in order to cancel the force Fz, a weight, which is as heavy as the above-described weight, is tied via a rope to the tire mounting location, thereby exerting a downward force Fz.

By doing so, only the moment Mx is exerted on the multi-component force gauge, which allows the moment Mx to be calibrated in the multi-component force gauge.

In this connection, the conventional moment calibration method requires, as described above, to exert loads, which are parallel in vertically opposite directions to each other, on the force transmitting member in either of the calibration apparatus for separately calibrating the multi-component force gauge or the calibration apparatus for calibrating the multi-component force gauge that is in the state incorporated in the tire spindle. To achieve this, it is necessary for both of the calibration apparatus to include, as illustrated in FIG. 4, the pulley for pulling the rope along a predetermined (upward in FIG. 4) direction.

The use of the pulley, however, causes a frictional force to arise between the pulley and the rope and accordingly reduces accuracy in moment calibration due to the frictional force. In addition, when the pulley is used, friction on a sliding surface (a bearing) of the pulley also contributes to the reduction in accuracy. Further, in the example shown in FIG. 4, because the moment Mx is not accurately exerted on the multi-component force gauge when the load applied to the force transmitting member is deviated from the vertical direction, a location to install the pulley should be exactly adjusted above the force transmitting member along the vertical direction. This location adjustment of the pulley, which is a delicate and time-consuming task, has impaired workability in moment calibration.

Moreover, because the rope or wire is typically twisted, a torsional force caused by the twisting is also exerted on the force transmitting member. As the loads become greater, the torsional force is increased and may be added as an error to a measurement in the multi-component force gauge. Accordingly, in the moment calibration method using the rope or wire, great hysteresis results from the frictional force or the torsional force described above, and it has been impossible due to the hysteresis to perform moment calibration with a high degree of accuracy.

CITATION LIST

Patent Document

Patent Document: Japanese Patent No. S59-151032

SUMMARY OF THE INVENTION

The present invention, which was made in view of the aforesaid problems, therefore aims to provide a moment calibrating apparatus for a multi-component force gauge and a calibration method capable of calibrating a moment accurately and effectively.

The moment calibrating apparatus for a multi-component force gauge of this invention is able to measure at least two component values including a force along an axis and a moment about an orthogonal axis to the axis. The moment calibrating apparatus comprises an elongated force transmitting member that has a base end portion connected to the multi-component force gauge and a tip end portion located on an opposite side of the base end portion and transmits a force applied to the tip end portion to the multi-component force gauge, a load applying mechanism for applying a load to the tip end portion of the force transmitting member along a vertical direction without changing a direction of force, and a calculation unit that calculates, based on a moment about an axis along a direction orthogonal to the vertical direction measured by the multi-component force gauge under a condition that a vertical load is being applied along the vertical direction from the load applying mechanism to the tip end portion, a true moment from which an effect of the vertical load is eliminated. In the thus-constructed moment calibrating apparatus, the true moment calculated by the calculation unit is used to perform moment calibration on the multi-component force gauge.

MODE FOR CARRYING OUT THE INVENTION

Embodiment 1

Hereinafter, a moment calibrating apparatus 1 according to a first embodiment of the present invention and a calibration method will be described with reference to the drawings.

Before explaining a configuration of the moment calibrating apparatus 1, a tire testing apparatus 2 in which the moment calibrating apparatus 1 is installed is described first.

Figure 1:
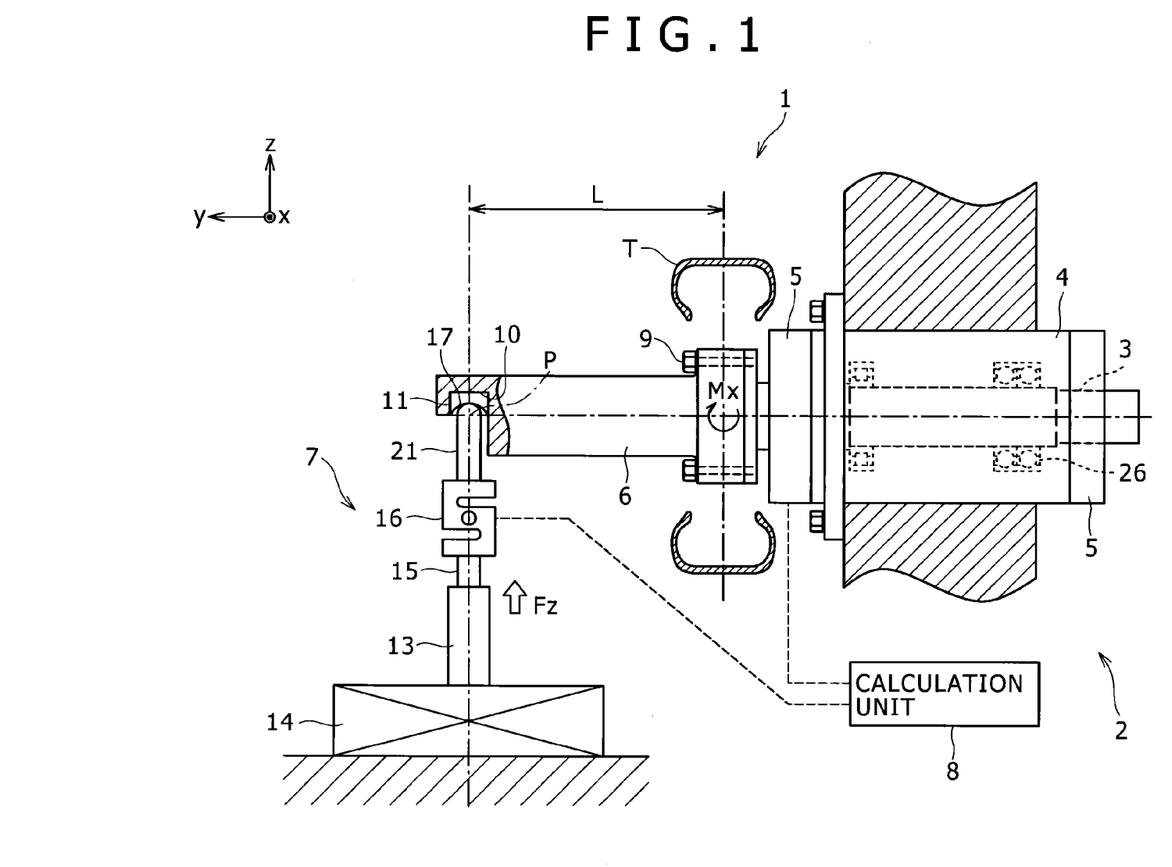
FIG. 1 is a front view showing a moment calibrating apparatus for calibrating a moment about an axis along an x direction according to a first embodiment.

The tire testing apparatus 2 includes, as shown in FIG. 1, a spindle shaft 3 disposed with the center of its axis oriented along a lateral direction, a housing 4 for supporting the spindle shaft 3, and a multi-component force gauge 5 mounted on the housing 4. Bearings 26 are provided between the spindle shaft 3 and the housing 4. The bearings 26 support the spindle shaft 3 rotatably about the laterally oriented axis relative to the housing 4. A tire T may be mounted on an end (a left end) of the spindle shaft 3 using a not-illustrated rim or the like. The rotation of the spindle shaft 3 relative to the housing 4 can cause the tire T mounted on the spindle shaft 3 to be rotated about the laterally oriented axis. Further, the housing 4 is supported by a frame of the tire testing apparatus.

The multi-component force gauges 5 are disposed on left and right ends of the housing 4. The multi-component force gauges 5 measure a force or a moment exerted from the spindle shaft 3 onto the housing 4. In this embodiment, a six component force gauge is illustrated by way of example as the multi-component force gauge 5. The multi-component force gauge 5 is the six component force gauge of a strain gauge type in which an inner member and an outer member spaced apart from each other are connected by a strain body. The multi-component force gauge 5 is able to measure forces (Fx, Fy, Fz) along an x direction, a y direction, and a z direction and moments (Mx, Mz) about axes along the directions generated at the center of the tire T mounted on the spindle shaft 3 (hereinafter, a location of the center is referred to as a tire mounting location).

As shown in FIG. 1, the moment calibrating apparatus 1 of the first embodiment calibrates the forces (loads) and moments measured by the multi-component force gauge 5 in the tire testing apparatus 2. The moment calibrating apparatus 1 includes a force transmitting member 6 for transmitting an applied force to the multi-component force gauge 5, and a load applying mechanism 7 for applying a load to the force transmitting member 6 along a vertical direction, and a calculation unit 8 for calculating, from a moment value that is measured by the multi-component force gauge 5 under a condition that the vertical load is being applied by the load applying mechanism 7, a true moment from which an effect of the vertical load is eliminated.

The moment calibrating apparatus 1 has different configurations in a way of mounting the force transmitting member 6, in a direction of applying the load, or in other ways depending on which of the moments Mx and Mz is to be calibrated. Thus, an example of applying the load Fz to the force transmitting member 6 for calibrating the moment Mx is firstly illustrated to explain the moment calibrating apparatus 1 of the first embodiment.

It should be noted that the following explanation is provided taking the top and bottom of FIG. 1 as a top and a bottom in the description of the moment calibrating apparatus 1 and taking right and left sides of FIG. 1 as a right side and a left side in the description of the moment calibrating apparatus 1. Further, in an explanation about the load or the moment, a right and left direction of FIG. 1 is referred to as the y direction, an up and down direction of FIG. 1 is referred to as the z direction, and a direction orthogonal to both the y direction and the z direction is referred to as the x direction.

The force transmitting member 6 is a long rod-shaped member disposed along the right and left direction (horizontal direction). The base end portion of the force transmitting member 6 is connected to a left end of the spindle shaft 3 using a bolt 9. The base end portion is firmly fixed to the spindle shaft 3. This ensures that a force is reliably transmitted via the spindle shaft 3 to the multi-component force gauge 5.

A lower surface of the tip end portion in the force transmitting member 6 includes a recess 10 formed into an upwardly recessed shape. A receiving member 11 is fitted into the recess 10. The receiving member 11 constitutes a load transmitting part which will be described below. The load applying mechanism 7 for applying the load to the force transmitting member 6 is arranged below the receiving member 11.

The load applying mechanism 7 applies a load along the vertical direction to the force transmitting member 6. Any load applying mechanism of various types, such as a weight type or a hydraulic type, that does not change a direction of force in a path for applying the force may be used as the load applying mechanism 7. In this embodiment, the load applying mechanism 7 includes a cylinder 13 disposed below the force transmitting member 6 to impose a load on the force transmitting member 6 and a support base 14 for supporting the cylinder 13.

Meanwhile, in a case of calibrating a moment, it is necessary that a vertical load should be exerted along either upward or downward direction on the force transmitting member 6, to thereby generate a moment of a predetermined value at the tire mounting location. However, the load applied by the load applying mechanism 7, which is needed to generate the moment, makes it difficult to perform moment calibration with a high degree of accuracy because the load is also detected together with the moment in the multi-component force gauge 5. For this reason, it has been considered as common general technical knowledge by a person skilled in the art that another load for cancelling the load applied to generate the moment should be separately applied. The cancelling load is vertically opposite in a force acting direction to the load applied to generate the moment. In other words, both the moment generating load and the cancelling load, which are vertically opposite in acting direction and parallel to each other, are exerted on the force transmitting member 6.

However, to exert the loads along the vertical direction by means of the load applying mechanism of the weight type, a rope that tends to cause an error due to twisting, a pulley that tends to cause an error due to friction, and the like are needed. Further, in a case where the upward load is applied to the force transmitting member 6, a location to install the pulley must be precisely adjusted so as to exactly match the acting direction of the load with the vertical direction. It is, however, difficult in actuality to exactly match the location to install the pulley with the vertical direction (i.e. to align a direction of the applied load with the vertical direction) because the location to install the pulley must be shifted in response to a change of the applied load.

Thus, in the moment calibrating apparatus 1 of the first embodiment, the load applying mechanism 7 for applying the load along the vertical direction does not cause a change in the direction of force that has otherwise been changed relative to the tip end portion of the force transmitting member 6 when the pulley is used. In addition, the moment calibrating apparatus 1 includes the calculation unit 8 that calculates, from the moment value measured by the multi-component force gauge 5 under the condition that the vertical load is being applied from the load applying mechanism 7, the true moment from which the effect of the vertical load is eliminated. Accordingly, the true moment calculated in the calculation unit 8 can be used to perform moment calibration of the multi-component force gauge 5.

Specifically, the load applying mechanism 7 in this embodiment includes the cylinder 13 that is arranged below the force transmitting member 6 to exert the load on the force transmitting member 6 and the support base 14 that supports the cylinder 13 and positions the cylinder 13 immediately beneath a position at which the load is applied. The cylinder 13 is arranged to be located always below the load applying position P on the force transmitting member 6.

The cylinder 13 can be extended or retracted along the vertical direction to apply an upward load on the force transmitting member 6. In this embodiment, an oil hydraulic cylinder capable of extending or retracting a cylinder rod 15 movable along the up and down direction is used. A load measuring device 16 of a strain gauge type is arranged above the cylinder 13 to measure a load exerted from the cylinder 13 to the force transmitting member 6. On the other hand, the support base 14 is arranged below the cylinder 13 to support the cylinder 13 in an upright position so that a load applying direction is vertically maintained.

The support base 14 is positioned using a pin or the like relative to a stationary part (such as, for example, an unactuated artificial road surface). The support base 14 positions the cylinder 13 in such a manner that a vertically upward load is always exerted from below onto the predetermined load applying position P by the cylinder 13. The load applying position P is defined at a location separated from a left end of the spindle shaft 3 by a predetermined length L along the horizontal direction. In other words, the load applying position P is established at a location separated from the multi-component force gauge 5 by a predetermined distance.

The load transmitting part includes a spherically shaped seat 17 formed into a concave shape on the receiving member 11 disposed on a force transmitting member 6 side and a pusher rod 21 having a convex region (a spherically shaped seat) formed into a spherical shape and disposed on a cylinder 13 side. The receiving member 11 is fitted into the recess 10 formed in the lower surface of the force transmitting member 6 at the load applying position P located at the predetermined distance from the multi-component force gauge 5 (the load applying position P separated from the left end of the spindle shaft 3 by the predetermined length). The convex region provided on an upper end of the pusher rod 21 has the spherically shaped seat formed of a spherical surface whose radius of curvature is smaller than that of the spherically shaped seat 17 of the receiving member 11. The receiving member 11 is installed in the recess 10 with a center position of the radius of curvature of the spherically shaped seat 17 matching the center of rotation of the spindle shaft 3 when viewed along an axial direction of the spindle shaft 3. This facilitates operation to perform positioning of the spindle shaft 3 in a rotating direction thereof on the force transmitting member 6. Further, the receiving member 11 is also installed with its most upwardly recessed point on the spherical surface of the spherically shaped seat 17 being located at the load applying position P when viewed along an axial direction of the cylinder 13.

The calculation unit 8 calculates, from the moment value measured in the multi-component force gauge 5 under the condition that the vertical load is being applied by the load applying mechanism 7, the true moment in which the effect of the vertical load is eliminated. A load measured by the load measuring device 16 disposed above the cylinder 13 is input along with a load and a moment value measured by the multi-component force gauge 5 into the calculation unit 8. The calculation unit 8 can output the true moment calculated based on the input loads and the moment value. Specifically, a personal computer is used as the calculation unit 8. The calculation unit 8 is able to perform processing specified in a moment calibration method, which will be described further below.

Note that, in the above example, the apparatus for calibrating the moment Mx generated at the tire mounting location by upwardly exerting the vertical load Fz on the force transmitting member 6 has been described, and the apparatus will have a different configuration when the moment to be calibrated is a moment My about the axis along the y direction.

Thus, using the above-described moment calibrating apparatus 1, each of the moments Mx, Mz about the axes along the x direction and the z direction can be measured.

Next, the moment calibration method using the above-described moment calibrating apparatus 1 will be described. Referring to an example of calibrating the moment Mx, the moment calibration method is described below.

In the calibration method for calibrating the moment Mx, the base end portion of the elongated force transmitting member 6 is firstly mounted on the multi-component force gauge 5 (the left end of the spindle shaft 3), to allow transmission of a force exerted on the base end portion of the force transmitting member 6 to the multi-component force gauge 5. Then, the load Fz is upwardly exerted along the vertical direction on the base end portion of the force transmitting member 6, and the true moment Mx free from the effect of the vertical load Fz is calculated from the moment value measured in the multi-component force gauge 5 while the vertical load Fz is being applied. After that, the calculated true moment Mx is used to perform moment calibration on the multi-component force gauge 5. More specifically, the moment calculation method is carried out as described below.

First, the base end side of the force transmitting member 6 is firmly fixed by means of the bolts 9 to the left end of the spindle shaft 3 from which the tire T and the rim to mount the tire T have been detached. The force transmitting member 6 is mounted with its axial direction oriented horizontally along the y direction. Next, the load applying mechanism 7 is arranged below the receiving member 11 disposed on the tip end portion of the force transmitting member 6. The load applying mechanism 7 is placed in such a manner that the convex spherically shaped seat disposed on the top of the pusher rod 21 is brought into point contact with the spherically shaped seat 17 of the receiving member 11 in the vicinity of the load applying position.

Then, the cylinder 13 in the load applying mechanism 7 is extended to exert the upward load along the vertical direction on the tip end portion of the force transmitting member 6. In this way, at least the load Fz along the vertical direction caused by extending the cylinder 13 is measured in the load measuring device 16 installed above the cylinder 13. The measured load Fz is sent to the calculated unit 8.

On the other hand, the force transmitting member 6 to which the upward load is applied at the top end portion from the load applying mechanism 7 is also subjected to the moment Mx that forces the force transmitting member 6 to rotate about the axis along the x direction relative to the tire mounting location. The moment Mx is a product of the length L from the tire mounting location to the load applying position P and the vertical load Fz exerted on the force transmitting member 6.

The force transmitting member 6 receives not only the moment Mx but also the upward vertical load Fz. Both the moment and the load are transmitted as a complex load via the spindle shaft 3 to the multi-component force gauge 5. For this reason, the value measured by the multi-component force gauge 5 represents a moment value Mx' containing an error or other components resulting from the load Fz rather than the true moment Mx.

It should be noted that when the moment Mz is obtained, a direction of mounting the force transmitting member 6 may be changed as described above. Then, a moment Mz' can be measured by the multi-component force gauge 5 as in the case of the moment Mx'. Each of the thus-measured moment value Mx', Mz' is sent to the calculation unit 8.

In the calculation unit 8, the true moments Mx, My, Mz are calculated based on the loads Fx, Fy, Fz input from the load measuring device 16 and Fx', Fy', Fz', Mx', My', Mz' measured by the multi-component force gauge 5. The true moments are found as described below.

Firstly, a matrix including elements composed of six output values actually output from the multi-component force gauge 5 (output values Fx', Fy', Fz' of the loads along the x direction, y direction and z direction and output values Mx', My', Mz' of the moments about the axes along those directions) is defined as a matrix E, while a matrix including elements composed of the forces (Fx, Fy, Fz) and moments (Mx, My, Mz) actually generated at the tire mounting location is defined as a matrix F as shown in the following expression (1).

$$F = \begin{bmatrix} F_x \\ F_Y \\ F_z \\ M_x \\ M_y \\ M_z \end{bmatrix} \quad (1)$$

$$E = \begin{bmatrix} F'_x \\ F'_y \\ F'_z \\ M'_x \\ M'_y \\ M'_z \end{bmatrix}$$

Then, a relationship described by the following equation (2) is obtained between the matrix E and the matrix F.

$$F = C^{-1} \cdot E \quad (2)$$

Where F is a matrix whose elements are composed of the forces and the moments actually generated at the tire mounting location;

E is a matrix whose elements are composed of the values actually output from the multi-component force gauge, and $C^{-1}$ is a transformation matrix.

Here, the transformation matrix $C^{-1}$ is as follows.

$$C^{-1} = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix} \quad (3)$$

By combining the above-described expressions (1) to (3), the forces and the moments actually generated at the tire mounting location are expressed as shown in expression (4).

$$F_x = a_{11}F_x' + a_{12}F_y' + a_{13}F_z' + a_{14}M_x' + a_{15}M_y' + a_{16}M_z'$$

$$F_y = a_{21}F_x' + a_{22}F_y' + a_{23}F_z' + a_{24}M_x' + a_{25}M_y' + a_{26}M_z'$$

$$F_z = a_{31}F_x' + a_{32}F_y' + a_{33}F_z' + a_{34}M_x' + a_{35}M_y' + a_{36}M_z'$$

$$M_x = a_{41}F_x' + a_{42}F_y' + a_{43}F_z' + a_{44}M_x' + a_{45}M_y' + a_{46}M_z'$$

$$M_y = a_{51}F_x' + a_{52}F_y' + a_{53}F_z' + a_{54}M_x' + a_{55}M_y' + a_{56}M_z'$$

$$M_z = a_{61}F_x' + a_{62}F_y' + a_{63}F_z' + a_{64}M_x' + a_{65}M_y' + a_{16}M_z' \quad (4)$$

The forces and moments actually generated at the tire mounting location can be obtained using the above-described expressions. Then, the product of the load actually applied to the force transmitting member 6 using the load applying mechanism 7 (i.e. the load measured by the load measuring device 16) and the length L from the tire mounting location to the load applying position P is compared with the moment (the true moment) calculated using the above expression. When any difference is found between the product and the moment, the multi-component force gauge 5 is calibrated after confirming that the force transmitting member 6 and the load applying mechanism 7 are properly installed. The calibration of the multi-component force gauge 5 may be achieved, for example, by adjusting the multi-component force gauge 5 or devices (for example, amplifiers) that perform processing, such as amplification, of the output from the multi-component force gauge 5.

The calibration in this embodiment will be described in greater detail. The calibration described herein is to find values of 36 elements in the transformation matrix $C^{-1}$. After the transformation matrix $C^{-1}$ is determined, in actually using the multi-component force gauge 5 after the calibration, true weights and moments (the matrix F) are obtained from signals (the matrix E) output from the multi-component force gauge 5 using the transformation matrix $C^{-1}$.

In this calibration, the force transmitting member 6 is mounted on a predetermined location in six mounting ways to apply a (possible) necessary load in each of the mounting ways, and output signals of the multi-component force gauge 5 obtained by the application of the load are recorded. Then, after a series of measurements performed for each mounting way are completed, a calculation to find the transformation matrix $C^{-1}$ is performed.

For example, in the mounting way to generate the moment Mx, each value is obtained as described below.

Fx=0
Fy=0
Fz=output value of load measuring device
Mx=(output value of load measuring device)×(length L)
My=0
Mz=0

Each element value of the matrix E=value of output signal from multi-component force gauge 5 obtained by application of load In the mounting way to generate the moment My and in the mounting way to generate the moment Mz, each of the values is also found as in the case of the moment Mx.

Further, in the mounting way to generate only Fz, each of the values is found as described below.

Fx=0
Fy=0
Fz=output value of load measuring device
Mx=0
My=0
Mz=0

Each element value of the matrix E=value of output signal from multi-component force gauge 5 obtained by application of load In the mounting way to generate only Fx and in the mounting way to generate only Fy, each of the values is found as in the case of Fz.

Then, after the completion of the series of measurements in each of the mounting ways, i.e. after all measurements performed in the six mounting ways are finished, the values of 36 elements of the transformation matrix $C^{-1}$ are found from relationships (six relationships) between the obtained matrices F and E using the method of least squares.

In the above-described moment calibrating apparatus 1 and the calibration method, the cylinder 13 of the load applying mechanism 7 may be always placed by means of a pin or the like at the same location below the load applying position P located at the predetermined distance from the tire mounting location. Then, the cylinder 13 can be caused to consistently exert the vertical upward load via the load transmitting part on the force transmitting member 6 (on the load applying position P). Accordingly, because an error component that has been added by using the pulley or the rope is no longer included in the load, a predetermined moment can be accurately generated at the tire mounting location. Moreover, occurrences of twisting of the rope or wire and of the frictional force between the rope or wire and the pulley are avoided, and adjustment of the location to install the pulley is no longer needed. As a result, the moment can be calibrated with a high degree of accuracy in the multi-component force gauge 5 installed in the tire testing apparatus 2.

Embodiment 2

Next, the moment calibrating apparatus 1 and the calibration method according to a second embodiment of the present invention will be described.

Figure 2:
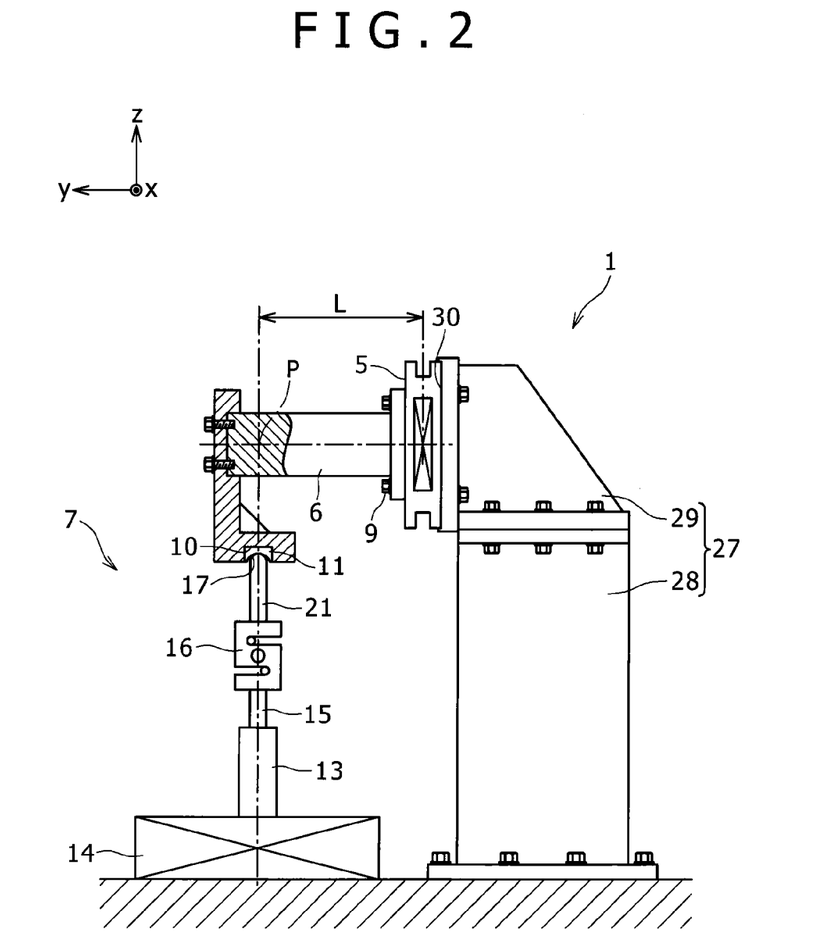
FIG. 2 is a front view showing the moment calibrating apparatus for calibrating the moment about the axis along the x direction according to a second embodiment.
Figure 3:
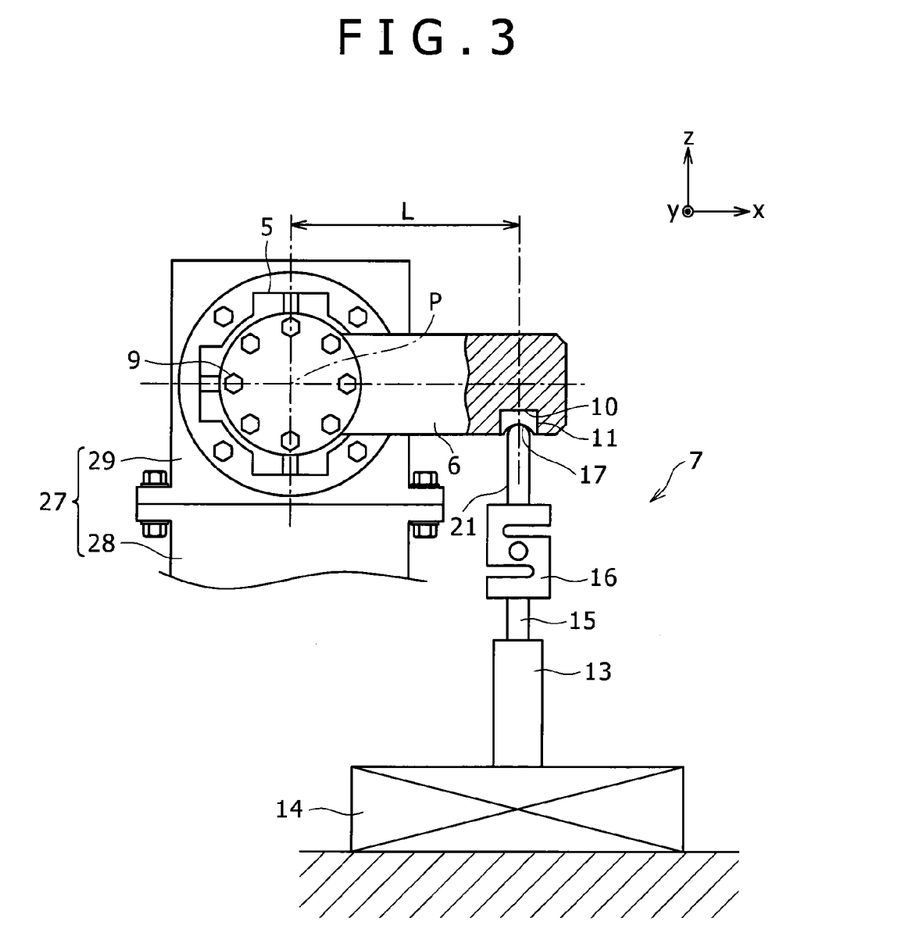
FIG. 3 is a front view showing the moment calibrating apparatus for calibrating the moment about an axis along a y direction according to the second embodiment.

As shown in FIGS. 2 and 3, the moment calibrating apparatus 1 and the calibration method of the second embodiment are different from those of the first embodiment in that the moment calibrating apparatus 1 and the calibration method of the first embodiment relate to calibration of the multi-component force gauge 5 incorporated in the spindle whereas those of the second embodiment are to calibrate the multi-component force gauge 5 itself removed from the tire testing apparatus 2.

The moment calibrating apparatus 1 in the second embodiment is equipped with a support member 27 for fixing the multi-component force gauge 5 onto a stationary part such as a floor surface or a rigid base plate. The support member 27 is composed of a bottom member 28 fixed to the stationary part in a vertically oriented position and a top member 29 mounted on an upper end of the lower member 28. The top member 29 is extended from a base end thereof mounted on the upper end of the bottom member 28 along the horizontal direction, and a vertically oriented mounting surface 30 is formed on a tip end of the top member 29. The multi-component force gauge 5 removed from the tire testing apparatus 2 can be mounted on the mounting surface 30.

Threaded holes are formed in a surface of the multi-component force gauge 5, and the force transmitting member 6 can be mounted along the horizontal direction on the multi-component force gauge 5 by inserting fasteners (bolts) in the threaded holes.

The moment calibration method using the moment calibrating apparatus 1 of the second embodiment is performed as described below.

That is, when the moment to be calibrated is the moment Mx about the axis along the x direction, the force transmitting member 6 is horizontally fixed along the y direction to the multi-component force gauge 5 mounted on the mounting surface 30 of the support member 27, to upwardly exert the vertical load Fz on the force transmitting member 6 in a manner similar to that of the first embodiment. As a result, the moment Mx about the axis along the x direction is generated at the center of the multi-component force gauge 5, to allow accurate calibration of the moment Mx.

Further, when the moment to be calibrated is the moment Mz about the axis along the z direction, the multi-component force gauge 5 is mounted in its position rotated by 90 degrees about the axis along the y direction on the mounting surface 30. Then, the force transmitting member 6 is horizontally attached along the y direction in a manner similar to that for calibration of the moment Mx to exert the vertical load on the force transmitting member 6. In this way, the moment Mz about the axis along the x direction is generated at the center of the multi-component force gauge 5, to allow accurate calibration of the moment Mz.

Still further, when the moment to be calibrated is the moment My about the axis along the y direction, the force transmitting member 6 is horizontally fixed along the x direction to the multi-component force gauge 5 as shown in FIG. 3, to upwardly exert the vertical load Fz in the manner similar to that of the first embodiment. As a result, the moment My about the axis along the y direction is generated at the center of the multi-component force gauge 5, to allow accurate calibration of the moment My.

Summary of Embodiments

The above embodiments are summarized as described below.

(1) The present invention is the moment calibrating apparatus for the multi-component force gauge capable of measuring at least two component values including a force along an axis and a moment about an orthogonal axis to the axis. The above-described moment calibrating apparatus comprises the force transmitting member that has the base end portion connected to the multi-component force gauge and the tip end portion located on the opposite side of the base end portion and the elongated force transmitting member that transmits the force exerted on the tip end portion to the multi-component force gauge, the load applying mechanism that applies the load to the tip end portion of the force transmitting member along the vertical direction without changing the direction of force, and the calculation unit that calculates, based on the moment value about the axis along the direction orthogonal to the vertical direction measured by the multi-component force gauge under the condition that the vertical load is being applied from the load applying mechanism along the vertical direction to the tip end portion, a true moment from which the effect of the vertical load is eliminated. In the moment calibrating apparatus, the true moment calculated in the calculation unit is used to perform moment calibration on the multi-component force gauge.

In this aspect, because twisting of the rope or wire and the frictional force between the rope or wire and the pulley, which have been present in the conventional calibration apparatus as shown in FIG. 4, are prevented from occurring and because a time-consuming effort to adjust the location to install the pulley is no longer required, the moments measured by the multi-component force gauge installed in the tire testing apparatus can be calibrated accurately and effectively.

(2) In the above-described moment calibrating apparatus, the force transmitting member is preferably mounted on the multi-component force gauge in such a manner that a longitudinal direction of the force transmitting member is oriented along the horizontal direction.

In this aspect, because application of the load along the vertical direction is facilitated, the moments can be accurately calibrated without increasing in complexity of the apparatus configuration.

(3) In the above-described moment calibrating apparatus, the load applying mechanism preferably includes the cylinder that is disposed below the force transmitting member to exert the upward load on the force transmitting member, a support base for positioning the cylinder directly below the load applying position (immediately beneath the load applying position), and the load transmitting part for transmitting the upward load exerted along the vertical direction by the cylinder to the force transmitting member. The load transmitting part may be, for example, a structure including the spherically shaped convex seat formed, for example, on an upper end of the cylinder and the spherically shaped concave seat that is brought into point contact with the above-described spherically shaped seat.

Thus, the method of applying the load by means of the cylinder is suitable for a situation in which a load greater than that applied in the method of using a weight is applied, and able to apply a load of up to approximately 80 kN as in the case of the tire testing apparatus, for example. In addition, when the load applying mechanism and the load transmitting part as described above are used, it becomes possible that the cylinder is disposed below the tip end portion of the force transmitting member, to exert a heavy load along the vertical direction on the load transmitting member.

The moment calibrating apparatus described above is preferably applied to the tire testing apparatus in which the moments generated at the center of the tire mounted on the spindle are measured in the multi-component force gauge.

(4) The present invention is the moment calibration method for the multi-component force gauge installed on a spindle housing to measure the moment generated at the center of the tire mounted on the spindle in the tire testing apparatus. In the moment calibration method, the above-described moment calibrating apparatus for the multi-component force gauge is used to calibrate the multi-component force gauge that is in a state installed on the spindle housing.

(5) The present invention is the moment calibration method for the multi-component force gauge capable of measuring at least two component values including a force along an axis and a moment about an orthogonal axis to the axis. The moment calibration method comprises mounting the base end portion of the elongated force transmitting member on the multi-component force gauge to allow transmission of the force exerted on the tip end portion of the elongated force transmitting member to the multi-component force gauge, applying the vertical load along the vertical direction to the tip end portion of the force transmitting member without changing the direction of force, calculating, based on the moment value about the axis along the direction orthogonal to the vertical direction measured by the multi-component force gauge under the condition that the vertical load is being applied to the tip end portion of the force transmitting member, the true moment from which the effect of the vertical load is eliminated, and using the calculated true moment to perform moment calibration on the multi-component force gauge.

The present invention is not limited to any one of the above-described embodiments, and geometry, structure, material of each member and a combination of the members may be modified as appropriate within a range in which the essence of this invention is not changed.

For example, although the load applying mechanism 7 that upwardly applies the vertical load using the cylinder 13 is illustrated in the above embodiments, the application direction of the vertical load is not limited to the upward direction. Further, the means for producing the load is not necessarily the cylinder 13, and may be any means other than that causes a change in direction of force as in the case of using the rope and the pulley. For example, the load applying mechanism 7 that downwardly applies the vertical load by means of a weight suspended from the force transmitting member may be employed.

Moreover, in the first embodiment, because the moment calibrating apparatus 1 is installed in the tire testing apparatus, the load applying mechanism is placed on an artificial road surface. However, a spindle unit including the spindle housing and the multi-component force gauge may be removed from the tire testing apparatus, to perform calibration work using the spindle unit attached to a rigid support member as described in the second embodiment. In this case, the load applying mechanism may be installed on the rigid stationary part as achieved in the second embodiment.

1 moment calibrating apparatus
2 tire testing apparatus
3 spindle shaft
4 housing
5 multi-component force gauge
6 force transmitting member
7 load applying mechanism
8 calculation unit
9 bolt
10 recess
11 receiving member
13 cylinder
14 support base
15 cylinder rod
16 load measuring device
17 spherically shaped seat
21 pusher rod
22 concave surface
26 bearing 27 support member
28 bottom member in support member
29 top member in support member
30 mounting surface
L distance from tire mounting location to load applying position
P load applying position
T tire

The invention claimed is:

1. A moment calibrating apparatus for a multi-component force gauge capable of measuring at least two component values including a force along an axis and a moment about an orthogonal axis to the axis, comprising:
an elongated force transmitting member that includes a base end portion connected to the multi-component force gauge and a tip end portion located on an opposite side of the base end portion, and transmits a force input on the tip end portion to the multi-component force gauge;
a load applying mechanism comprising a load transmitting part that applies a load to the tip end portion of the force transmitting member along a vertical direction without changing a direction of force, and
a calculation unit that calculates, based on a moment value about an axis along a direction orthogonal to the vertical direction measured by the multi-component force gauge under a condition that the vertical load is being applied along the vertical direction to the tip end portion by the load applying mechanism, a true moment from which an effect of the vertical load is eliminated,
wherein the true moment calculated in the calculation unit is used to perform moment calibration on the multi-component force gauge,
wherein the tip end portion of the elongated force transmitting member includes a spherical part, and wherein the load transmitting part includes a spherical part that engages the spherical part of the tip end portion of the elongated force transmitting member to apply the load to the tip end portion of the force transmitting member along the vertical direction without changing a direction of force.

2. The moment calibrating apparatus for a multi-component force gauge according to claim 1, wherein the force transmitting member is mounted on the multi-component force gauge in such a manner that a longitudinal direction of the force transmitting member is oriented along a horizontal direction.

3. The moment calibrating apparatus for a multi-component force gauge according to claim 1, wherein:
the load applying mechanism further comprises;
a cylinder disposed below the force transmitting member to exert an upward load on the force transmitting member,
a support base for positioning the cylinder directly below a position where the load is applied,
wherein the load transmitting part transmits the upward load exerted along the vertical direction by the cylinder to the force transmitting member.

4. A moment calibration method for a multi-component force gauge installed on a spindle housing to measure a moment generated at a center of a tire mounted on a spindle in a tire testing apparatus, wherein the moment calibrating apparatus for a multi-component force gauge according to claim 1 is used to calibrate the multi-component force gauge that is in a condition installed on the spindle housing.

5. A moment calibration method for a multi-component force gauge capable of measuring at least two component values including a force along an axis and a moment about an orthogonal axis to the axis, comprising:
mounting a base end portion of an elongated force transmitting member on the multi-component force gauge to allow transmission of a force input on the base end portion of the force transmitting member to the multi-component force gauge;
applying a vertical load to the tip end portion of the force transmitting member along a vertical direction without changing a direction of force, using a load applying mechanism comprising a load transmitting part;
calculating, based on a moment value about an axis along a direction orthogonal to the vertical direction measured by the multi-component force gauge under a condition that the vertical load is being applied to the tip end portion of the force transmitting member, a true moment from which an effect of the vertical load is eliminated, and
using the calculated true moment to perform moment calibration on the multi-component force gauge,
wherein the tip end portion of the elongated force transmitting member includes a spherical part, and wherein the load transmitting part includes a spherical part that engages the spherical part of the tip end portion of the elongated force transmitting member to apply the load to the tip end portion of the force transmitting member along a vertical direction without changing a direction of force.

* * * * *